United States Patent

Van Loon

(10) Patent No.: US 6,503,637 B1
(45) Date of Patent: Jan. 7, 2003

(54) HEAT SEALABLE FILMS

(75) Inventor: Achiel Jos Van Loon, Schoten (BE)

(73) Assignee: Exxon Mobil Chemical Patents Inc., Houston, TX (US)

(*) Notice: Subject to any disclaimer, the term of this patent is extended or adjusted under 35 U.S.C. 154(b) by 0 days.

(21) Appl. No.: 09/367,993

(22) PCT Filed: Feb. 24, 1998

(86) PCT No.: PCT/US98/03597

§ 371 (c)(1),
(2), (4) Date: Dec. 6, 1999

(87) PCT Pub. No.: WO98/37139

PCT Pub. Date: Aug. 27, 1998

Related U.S. Application Data

(63) Continuation-in-part of application No. 08/905,211, filed on Aug. 1, 1997, now abandoned, and a continuation-in-part of application No. 08/847,730, filed on Apr. 28, 1997, now abandoned, and a continuation-in-part of application No. 08/806,182, filed on Feb. 25, 1997, now Pat. No. 6,094,889.

(51) Int. Cl.$^7$ ............................ B32B 27/32; C08L 23/08
(52) U.S. Cl. ..................... 428/516; 525/240; 53/482; 428/461; 428/476.1; 428/483; 428/523
(58) Field of Search .................... 525/240; 428/515, 428/516, 523, 461, 476.1, 483; 53/482

(56) References Cited

U.S. PATENT DOCUMENTS

| | | | |
|---|---|---|---|
| 5,206,075 A | 4/1993 | Hodgson | 428/216 |
| 5,322,726 A | 6/1994 | Dew | 428/216 |
| 5,358,792 A | 10/1994 | Mehta et al. | 428/516 |
| 5,376,439 A | 12/1994 | Hodgson et al. | 428/229 |
| 5,397,613 A | 3/1995 | Georgelos | 428/36.7 |
| 5,424,362 A | 6/1995 | Hwang et al. | 525/71 |
| 5,482,770 A | 1/1996 | Bekele | 428/339 |
| 5,523,136 A | 6/1996 | Fischer et al. | 428/35.2 |
| 5,530,065 A | 6/1996 | Farley et al. | 525/240 |
| 5,604,043 A | 2/1997 | Ahlgren | 428/518 |
| 5,629,059 A | 5/1997 | Desai et al. | 428/34.9 |
| 6,094,889 A * | 8/2000 | Van Loon et al. | 428/516 |

FOREIGN PATENT DOCUMENTS

| | | |
|---|---|---|
| EP | 0 597 502 | 5/1994 |
| EP | 0 764 679 | 3/1997 |
| JP | 9-99957 | 4/1997 |
| JP | 9-99973 | 4/1997 |
| JP | 9-141792 | 6/1997 |
| JP | 9-141793 | 6/1997 |
| JP | 9-150488 | 6/1997 |
| JP | 9-150489 | 6/1997 |
| WO | WO 92/14784 | 9/1992 |
| WO | WO 93/03093 | 2/1993 |
| WO | WO 94/06857 | 3/1994 |
| WO | WO 94/25271 | 11/1994 |
| WO | WO 94/26816 | 11/1994 |
| WO | WO 95/00333 | 1/1995 |
| WO | WO 95/13321 | 5/1995 |
| WO | WO 95/16724 | 5/1995 |
| WO | WO 95/15851 | 6/1995 |
| WO | WO 95/16729 | 6/1995 |
| WO | WO 95/21743 | 8/1995 |
| WO | WO 96/19533 | 6/1996 |
| WO | WO 96/32441 | 10/1996 |
| WO | WO 97/28960 * | 8/1997 |
| WO | WO 97/44178 | 11/1997 |

OTHER PUBLICATIONS

Derwent Abstract for JP 7278377—(Mitsubishi Chem Corp.) (1997).
Derwent Abstract for JP 8269264—(Nippon Gosei Gomu KK (JAPS) (1997).
Derwent Abstract for JP 9087330—(Tosoh Corp.) (1997).
Derwent Abstract for JP 9141793 A—(Tosoh Corp.) (1997).
Derwent Abstract for JP 9141792 A—San–El Kagaku Kogyo KK (Sane) (1997).
Derwent Abstract for EP 0 764 679 A1 (Mar. 1997).

* cited by examiner

Primary Examiner—D. Lawrence Tarazano
(74) Attorney, Agent, or Firm—Stephen D. Prodnuk; Leandro Arechederra

(57) ABSTRACT

A film comprising a blend of:
  i) a homopolymer of ethylene having a Mw/Mn of 3 or a copolymer of ethylene and up to 50% weight % of a $C_3$ to $C_{20}$ olefm, the copolymer having a CBDI of 50% or more;
  ii) a homopolymer of propylene or a copolymer of propylene and up to 50 weight % of a comonomer selected from the group consisting of ethylene and $C_4$ to $C_{20}$ alpha-olefms; and
  iii) a polymer produced in a high pressure process using a free radical initiator.

25 Claims, No Drawings

HEAT SEALABLE FILMS

CROSS-REFERENCE TO RELATED APPLICATIONS

This application is a continuation-in-part of Ser. No. 08/806,182, filed Feb. 25, 1997, now U.S. Pat. No. 6,094,889, Ser. No. 08/847,730, filed Apr. 28, 1997, now abandoned, and Ser. No. 08/905,211, filed Aug. 1, 1997, now abandoned, the disclosures of which are incorporated herein by reference in their entireties.

FIELD OF THE INVENTION

This invention relates to films comprising metallocene polyethylene (mPE), polypropylene and free radically high pressure produced polymers.

BACKGROUND OF THE INVENTION

Polyethylene has traditionally been used as a layer in polyolefin films and packaging because of its desirable properties such as moisture impermeability good sealing behavior, good optical properties and good organoleptics. Typically polyethylene has been coextruded, laminated or otherwise bonded to other polyolefins which have better strength than polyethylene, yet do not seal as well as polyethylene. For example, in a typically multilayer film, a polypropylene layer, especially a mono or biaxially oriented polypropylene (OPP) layer, provides a high clarity, high melting, high barrier properties, combined with high stiffness while a polyethylene layer will provide extra body to the film and will allow a low sealing temperature, meaning higher packaging speeds. However, polypropylene (PP) and polyethylene (PE) have very limited compatibility and direct sealing of polyethylene onto polypropylene film is not commonly done. When a layer of PE is combined with a layer of PP, extra primer may be needed. For example, extra primer is used when polyethylene, such as low density polyethylene, is coated onto polypropylene films. In addition tie layers may also be necessary. Coextrudable tie layers such as ethylene vinyl acetate copolymers, typically having more that 8 weight % vinyl acetate, have been extruded between PP and PE to enhance adhesion between the PE and the PP. Another solution to the compatibility problem has been to blend polypropylene into the polythylene. This however has the disadvantage or creating layers that have greater haze and are thus undesirable in the industry.

Therefore there is a need in the art to provide a means to provide a polyethylene polypropylene blend for film layers that does not have haze, yet retains good mechanical properties such impact strength.

U.S. Pat. No. 5,424,362 suggests paintable polyolefin compositions comprising i) 30 to about 70 wt % of at least one polypropylene or graft modified polypropylene; ii) 0 to about 40 wt % of at least one non grafted or graft-modified substantially linear ethylene polymer, and iii) 0 to about 50 wt % of an interpolymer of ethylene and an α, β unstaurated carbonyl copolymer. Molding techniques are suggested to fabricate the compositions.

WO 92/14784 suggests heat sealable compositions for film and film structures comprising (a) from 30 to 70 weight percent of a low melting polymer comprising and ethylene based sopolymer having a density from 0.88 g/cm$^3$ to 0.915 g/cm$^3$, a molucular weight distribution no greater than 3.5, and a composition distribution breadth index greater than 70 percent; and (b) 70 to 30 weight percent of a propylene based polymer having from 88 mole percent to 100 mole percent propylene and from 12 mole percent to 0 mole percent of an alpha-olefin other than propylene.

WO 94/26816 discloses blend of metallocene polyethylene and high molecular weight high density polyethylene for use in films.

SUMMARY OF THE INVENTION

This invention relates to a film comprising a blend of:

i) a homopolymer of ethylene having an Mw/Mn of 3 or less or a copolymer of ethylene and up to 50 weight % of a $C_3$ to $C_{20}$ olefin, wherein the copolymer has a CDBI of 50% or more, preferably 60% or more;

(ii) a homopolymer of propylene or a copolymer of propylene and up to 50 weight % of a comonomer, preferably copolymerized with ethylene and/or a $C_4$ to $C_{20}$ olefin; and (iii) a polymer produced in a high pressure process using a free radical initiator (High Pressure Polymer).

This invention also relates to films as described above where one or more layers are oriented in one or more directions to the same or different extents.

DETAILED DESCRIPTION OF THE INVENTION

In a preferred embodiment, this invention relates to a film comprising a blend of:

(i) a homopolymer of ethylene having an Mw/Mn of 3 or less, preferably between 1 and 2.5 or a copolymer of ethylene and up to 50 weight %, preferably 1 to 35 weight %, preferably 1–20 weight % of one or more $C_3$ to $C_{20}$ olefins, (based upon the weight of the copolymer) having an Mw/Mn of 6 or less, preferably 3 or less, even more preferably between 1 and 2.5, wherein the polymer or copolymer preferably has:

a) a density of 0.86 g/cm$^3$ to 0.96 g/cm$^3$, preferably 0.88 to 0.94 g/cm$^3$, more preferably between 0.88 g/cm$^3$ and 0.935 g/cm$^3$, more preferably between 0.88 g/cm$^3$ and 0.95 g/cm$^3$, more preferably between 0.915 g/cm$^3$ and 0.935 g/cm$^3$; and b) a CDBI of 50% or more, preferably above 60%;

(ii) a homopolymer of propylene or a copolymer of propylene and up to 50 weight %, preferably 1 to 35 weight %, even more preferably 1 to 6 weight % of ethylene and/or a $C_4$ to $C_{20}$ olefin; and (iii) polymer produced in a high pressure process using a free radical initiator (High Pressure Polymer).

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

The $C_3$ to $C_{20}$ and $C_4$ to $C_{20}$ olefin comonomers for the polyethylene or polypropylene copolymers described above may be any polymerizable olefin monomer and are preferably a linear, branched or cyclic olefin, even more preferably an α-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Suitable comonomers also include dienes, trienes, and styrenic monomers. Preferred examples include styrene, a-methyl styrene, para-alkyl styrene (such as para-methyl styrene), hexadiene, norbornene, vinyl norbornene, ethylidene norbornene, butadiene, isoprene, heptadiene, octadiene, and cyclopentadiene.

Preferred comonomers for the copolymer of ethylene are propylene, butene, hexene and/or octene.

The polyethylene or polypropylene copolymers described above may also contain termonomers and tetramonomers which may be one or more of the $C_3$ to $C_{20}$ olefins described above, any $C_4$ to $C_{30}$ linear, cyclic or branched dienes or trienes and any styrenic monomers such as styrene, α-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

The polyethylene copolymers described above preferably have a composition distribution breadth index (CDBI) of 50% or more, preferably above 60%, even more preferably above 70%. In one embodiment the CDBI is above 80%, even more preferably above 90%, even more preferably above 95%. In another particularly preferred embodiment, the polyethylene copolymer has a CDBI between 60 and 85%, even more preferably between 65 and 85%.

In a particularly preferred embodiment the ethylene homopolymer or copolymer has a CDBI of 65 to 85%, a density of 0.915 to 0.96 g/cm³ and a Mw/Mn between 1 and 2.5.

In another preferred embodiment the ethylene homopolymer or copolymer has a density of 0.86 to 0.925 g/cm³ and a CDBI of over 80%, preferably between 80 and 99%.

In another preferred embodiment the blend comprises a homopolymer of ethylene having an Mw/Mn of 3 or less, preferably between 2.5 and 1.

In general, the polyethylene homopolymers and copolymers described above are metallocene polyethylenes (mPE's). The mPE homopolymers or copolymers are typically produced using mono- or bis-cyclopentadienyl transition metal catalysts in combination with an activator such as alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from Exxon Chemical Company in Baytown Texas under the tradenames EXCEED™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

The polypropylene homopolymer or copolymer preferably has an MFR (melt flow rate) of 1 to 20 as measured according to ASTM D 1238 (230° C., 2.16 kg). In another embodiment the polypropylene homopolymer or copolymer preferably has a CDBI of 50% or more, preferably above 60%, even more preferably above 70%. Polypropylenes having a CDBI above 60% are available from Exxon Chemical Company in Baytown, Texas under the tradename ACHIEVE™.

In another embodiment the polypropylene homopolymer or copolymer can be blended with any of the other propylene homopolymers or copolmyers described above. Likewise, The polyethylene homopolymers or copolymers described above for use in the blend may be used alone, may be blended with any of the other polyethylene homopolymers or copolymers described above.

In a preferred embodiment the polymer produced in a high pressure process using a free radical initiator (High Pressure Polymer) is a polymer comprising one or more of C2 to C20 olefins and polar monomers. Preferred C2 to C20 olefins include, but are not limited to, ethylene, propylene, butene, pentene, hexene, octene, 3-methyl-pentene-1,4-methyl-pentene-1, cyclopentene, cyclohexene, hexadiene, norbornene, isobutene, norbornadiene, pentadiene and 3,5, 5-trimethyl hexene -1. Preferred polar monomers include, but are not limited to, acetates (such as vinyl acetate), acrylics (such as acrylic acid, methacrylic acid), acrylates (such as methacrylate, butylacrylate, methylmethacrylate, hydroxyethylmethylacrylate). Polar modifiers can also be used in high pressure free radical process such as alcohols (such as isopropanol ) or aldehydes (such as acetaldehyde). Other modifiers known in the art can also be used.

In a preferred embodiment the High Pressure Polymer is low density polyethylene (density 0.910 to less than 0.940 g/cm³ preferably 0.915 to less than 0.935 g/cm³, Even more preferably 0.920 to less than 0.935 g/cm³), a copolymer of ethylene and vinyl acetate, a copolymer of ethylene and methyl acrylate, a copolymer of acrylic acid, a copolymer of methylmethacrylate or any other polymers polymerizable by a high-pressure free radical process. The LDPE preferably has up to 20 weight % of comonomer. The EVA and acrylate copolymers preferably has 20 weight % of the polar monomer or less, preferably less than 10 weight %, even more preferably less than 6 weight %. In a preferred embodiment the Melt Index of the LDPE is between 0.2 and 50 g/10 min, preferably between 0.5 and 10 g/10 min, even more preferably between 0.6 and 5 g/10 min, even more preferably between 0.6 and 2.5 g/10 min.

Many such High Pressure Polymers are commercially available. For example, LDPE made in a high pressure process is available from Exxon Chemical Company under the trade name ESCORENE™. EVA made in a high pressure process is available from Exxon Chemical Company under the trade name ESCORENE™.

Polymethylmethacrylate made in a high pressure process is available from Exxon Chemical Company under the trade name ESCORENE™.

In a preferred embodiment the polyethylene (component (i)) is present in the blend at from 1 to 99 weight %, based upon the weight of the polymers in the blend, preferably the polyethylene is present at 10 to 90 weight %, even more preferably at least 20 to 80 weight %, even more preferably at least 30 to 70 weight %, even more preferably at least 40 to 70 weight %.

In a preferred embodiment the polypropylene (component (ii)) is present in the blend at from 1 to 99 weight %, based upon the weight of the polymers in the blend, preferably the polypropylene is present at 10 to 90 weight %, even more preferably at least 20 to 80 weight %, even more preferably at least 30 to 70 weight %, even more preferably at least 40 to 70 weight %.

In a preferred embodiment the High Pressure Polymer (component (iii)) is present in the blend at from 1 to 50 weight %, based upon the weight of the polymers in the blend, preferably at 2 to 30 weight %, even more preferably at least 5 to 20 weight %.

The blends described above can also further include other polymers such as polybutene, high density polyethylene (density 0.945 to less than 0.98 g/cm$^3$) linear low density polyethylene, medium density polyethylene (density 0.935 to less than 0.945 g/cm$^3$), polyvinylchloride, isotactic polybutene, ABS resins, elastomers such as ethylene-propylene rubber (EPR), vulcanized EPR, EPDM, block copolymer elastomers such as SBS, nylons, polycarbonates, PET resins, crosslinked polyethylene, copolymers of ethylene and vinyl alcohol (EVOH), polymers of aromatic monomers such as polystyrene, poly-1 esters, graft copolymers generally, polyacrylonitrile homopolymer or copolymers, thermoplastic polyamides, polyacetal, polyvinylidine fluoride and other fluorinated elastomers, polyethylene glycols and polyisobutylene.

The blends described above may be produced by mixing the three (or more) polymers together, by connecting reactors together in series to make reactor blends or by using more than one catalyst in the same reactor to produce multiple species of polymer. The polymers can be mixed together prior to being put into an extruder or may be mixed or compounded in an extruder.

The blends described above are typically formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film.

In a preferred embodiment a film of the blend is used as a sealing layer. In another preferred embodiment a film of the blend is used as that functional layer, that is to say it is used to provide mechanical strength and/or stiffness. Films of the blends described herein have excellent stiffness and mechanical strength as compared to films of the individual components.

This invention also relates to films as described above where one or more of the layers are oriented in the transverse and/or longitudinal directions to the same or different extents. This orientation may occur before or after the individual layers are brought together. For example the blend layer can be extrusion coated or laminated onto another layer or the layers can be coextruded together into a film then oriented. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions. Orientation to the same extent in both directions will generally produce roughly equal mechanical properties.

In another embodiment the blend layer is combined with one or more other layers. The other layer(s) may be any layer typically included in multilayer film structures. For example the other layer or layers may be:

1. Polyolefins

Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar polymers

Preferred polar polymers include homopolymers and copolymers of esters, amides, actates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, PVDC and the like.

Further any of the above layers may be oriented before or after being combined with the blend layers.

A particularly preferred embodiment includes an ABC structure film where the A layer comprises mPE or a blend comprising mPE and the B layer is a blend according to this invention and the C layer is a sealing layer for example a random copolymer of propylene and up to 20 weight % of ethylene, preferably 3 to 6 weight % ethylene, even more preferably 3.5 to 5.5 weight % ethylene, or a terpolymer of propylene, ethylene and butene.

In a preferred embodiment up to 100 μm thick monolayer films of the blend described above are characterized by a haze, as measured by ASTM 1003 condition A of 16% or less, more preferably 14% or less, more preferably 12% or less, more preferably 10% or less, even more preferably 5% or less.

The films described herein may vary in thickness depending on the intended application, however films of a thickness from 1 to 350 μm are usually suitable. Films intended for packaging are usually from 10 to 120 μm thick. The thickness of the sealing layer is typically 0.2 to 50 μm. There may be a sealing layer on both the inner and outer surfaces of the film or the sealing layer may be present on only the inner or the outer surface.

Additives such as antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins, tackifiers, and glass beads.

In another embodiment the layers may be modified by corona treatment, electron beam irradiation, gamma irradiation, or microwave. In particular the corona treatment will produce a significant difference in the coefficient of friction of the two surface layers as described in U.S. patent application Ser. No. 08/905,211, which is incorporated by reference herein.

In a particularly preferred embodiment film of the blends described herein are cast, blown or co-extruded and the polyethylene is present at 50 to 80 weight %, the polypropylene is present at 10 to 45 weight % and polymer produced in high pressure process using a free radical initiator is LDPE and is present at 2 to 10 weight %, based upon the weight of the blend.

In another embodiment films of the blends described herein are laminated to a substrate. Preferred substrates include polypropylene, polyamide, polyester, polyethylene, or metallized substrates.

The films described herein may also comprise from 5 to 60 weight %, based upon the weight of the polymer and the resin, of a hydrocarbon resin. The resin preferably has a softening point above 100° C., even more preferably from 130 to 180° C., even more preferably between 140 and 180° C. Preferred hydrocarbon resins include those described in EPA 288 227 and EPA 247 898. These films comprising a hydrocarbon resin may be oriented in uniaxial or biaxial directions to the same or different degrees.

In a preferred embodiment this invention also relates to a method to produce a film characterized by good haze values comprising:

i) selecting a first polymer having a CDBI of 50% or more comprising homopolyethylene or a copolymer of ethylene and up to 50 weight % of a $C_3$ to $C_{20}$ olefin, ii) selecting a second polymer comprising homopolypropylene or a copolymer of propylene and up to 50 weight % of ethylene or a $C_4$ to $C_{20}$ olefin, iii) selecting a third polymer comprising one or more polymers produced in a high pressure process using a free radical initiator, and iv) combing the first, second and third polymers and forming them into a film.

In a preferred embodiment this invention also relates to a method of packaging an article comprising:

i) selecting a first polymer having a CDBI of 50% or more comprising homopolyethylene or a copolymer of ethylene and up to 50 weight % of a $C_3$ to $C_{20}$ olefin, ii) selecting a second polymer comprising homopolypropylene or a copolymer of propylene and up to 50 weight % of ethylene or a $C_4$ to $C_{20}$ olefin, iii) selecting optional polymers for core layers, iv) combing the first polymer and second polymer so that the first polymer forms all or part of a film surface layer and the second polymer forms all or part of a film surface layer and, if present, the optional polymers for core layers are formed into film layers in between the first surface layer and the second surface layer, v) enclosing an article in the film, and vi) heat sealing the enclosed article such that at least one seal is formed by heat sealing the first surface layer to the second surface layer.

In a preferred embodiment the films formed from the blends described herein when formed into a film 50 μm thick film have an average secant modulus greater than 350 MPa and a dart drop impact strength greater than 5 g/micron.

Additionally the film produced herein can be laminated with another film such as polyethylene, polypropylene, polyester, polyamides and the like which may or may not be oriented. These combinations are particularly suitable for high quality packaging performance such as modified atmosphere packaging or controlled atmosphere packaging.

The films produced herein may be used for typical packaging applications, form fill and seal applications, cling films, stretch films, frozen film, heavy duty packaging film, can liners and other similar applications.

EXAMPLES

Materials

ECD 109 is an ethylene hexene copolymer produced in the gas phase having about 4.1 weight % hexene, a melt index of about 0.8 g/10 min, a CDBI of about 59, an Mw/Mn of about 2.3 and a density of about 0.928 g/cm³, sold under the tradename EXCEED™ by Exxon Chemical Company in Baytown, Tex.

ECD 103 is an ethylene hexene copolymer produced in the gas phase having approximately 7.6 weight % hexene, a melt index of about 1 g/10 min, a Mw/Mn of about 2.3, a CDBI of about 67% and a density of about 0.917 g/cm³, sold under the tradename EXCEED™ by Exxon Chemical Company in Baytown, Tex.

ECD 202 is an ethylene hexene copolymer produced in the gas phase having approximately 7.6 weight % hexene, a melt index of about 2.4 g/10 min, a Mw/Mn of about 2.3, a CDBI of about 67% and a density of about 0.917 g/cm³, sold under the tradename EXCEED™ by Exxon Chemical Company in Baytown, Tex.

PP-1 is a homopolymer of propylene having a Melt Index of about 2.9 g/10 min and a broad molecular weight distribution (Mw/Mn) sold under the trade name of ESCORENE PP 4352F1 by Exxon Chemical Company.

LD-2 is a low density polyethylene having a density of about 0.922 g/cm3 and a melt index of about 0.75 g/ 10 min commercially available under the trade name ESCORENE LD 150 BW from Exxon Chemical Belgium.

LL-3 is ESCORENE LLN 1201 XV a ethylene butene copolymer having a Melt Index of about 0.7 g/10 min, a density of 0.925 g/cm3 and produced in a gas phase using a Ziegler Natta catalyst and is commercially available from Exxon Chemical Belgium.

Testing Methods

Composition Distribution Breadth Index (CDBI) is measured by the procedure described in PCT publication WO 93/03093, published Feb. 18, 1993. Fractions having a molecular weight (Mw) less than 15,000 were ignored. Melt Index (MI) was measured according to ASTM D 1238. (190° C., 2.16 kg) Density was measured according to ASTM D1505, where the sample was prepared according to ASTM D 1928/. Mw and Mn were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969.

Dyna Impact Strength properties (Max Force, Damaging Energy, Total Energy, Damaging Travel, Total Travel) were measured according to DIN 53373. Tensile properties (Tensile at yield, elongation at yield, tensile at break, elongation at break, and Secant Modulus) were measured according to ASTM D 882. Average secant modulus is the mathematical average of the MD Secant Modulus and the TD Secant Modulus.

Elmendorf Tear Strength (N/$\mu$m) was measured according to ASTM 1922.

Gloss was measured according to ASTM D2457/60°.

Dart Drop was measured acording to ASTM D 1709.

Heat seal testing procedure: Seal were made on a Topwave sealing machine. The film was folded between TEFLON™ film and inserted between the sealing bars. At various the sealing bars were closed with a pressure of 0.5 MPa for 0.5 seconds. The film was removed from the Top wave machine and conditioned for a minimum of 12 hours at 23°C. ±3°C. and 50% humidity ±5% humidity.

Seal Strength was tested according to the following procedure. After conditioning for a minimum of 12 hours at 23°C.±3° C. and 50% humidity±5% humidity, the seal strength of 15 mm wide sample was measured in a Zwick tensile instrument under the following conditions: speed-100 mm/min, load cell-200N, and clamp distance-50 mm. The film was placed between the clamps and the clamps were moved apart at a speed of 100 mm/min. During the rest the force (N) was recorded as a function of elongation (%). Four test specimens were measured and the average seal strength curve was recorded. The seal strength was the force at which the test specimen failed.

Example 1

Eleven monolayer films 50$\mu$thick of various blends were blown on an Alpine extruder under the conditions in Table 1, Table 3 and Table 6. The individual polymers were fed into the same extruder hopper at the same time. The blend components and test data on the resulting films are reported in Tables 2, 4, 5 and 7.

TABLE 1

|  | ECD109 95 w % PP-1 5 w % | ECD109 90 w % PP-1 10 w % | ECD109 80 w % PP-1 20 w % | ECD109 80 w % PP-1 15 w % LD-2 5 w % | ECD109 75 w % PP-1 20 w % LD-2 5 w % |
|---|---|---|---|---|---|
| Barrell temp settings (° C.) |  |  |  |  |  |
| zone 1 | 190 | 190 | 190 | 190 | 190 |
| zone 2 | 200 | 200 | 200 | 199 | 200 |
| zone 3 | 220 | 220 | 220 | 220 | 220 |
| zone 4 | 220 | 220 | 220 | 220 | 220 |
| zone 6 | 230 | 230 | 225 | 235 | 230 |
| zone 7 | 230 | 230 | 230 | 224 | 230 |
| zone 8 | 230 | 230 | 222 | 235 | 230 |
| zone 9 | 240 | 240 | 239 | 241 | 240 |
| zone 10 | 240 | 240 | 240 | 240 | 240 |
| zone 11 | 240 | 240 | 240 | 240 | 240 |
| zone 12 | 240 | 240 | 240 | 240 | 240 |
| diegap (mm) | 1.5 | 1.5 | 1.5 | 1.5 | 1.5 |
| cooling air temp (° C.) | 16 | 17 |  | 16 | 16 |
| Die Diam (mm) | 200 | 200 | 200 | 200 | 200 |
| Melt temp. (° C.) |  |  |  |  |  |
| T1 | 243 | 240 |  | 233 | 233 |
| T2 | 242 | 237 |  | 234 | 232 |
| T3 | 245 | 239 |  | 237 | 235 |
| T4 | 242 | 237 |  | 234 | 232 |
| T5 | 245 | 242 |  | 232 | 233 |
| Tmelt | 237 | 243 |  | 235 | 237 |
| Melt pressure (bar) |  |  |  |  |  |
| P1 | 545 | 526 |  | 464 |  |
| P2 | 518 | 491 |  | 444 |  |
| P3 | 501 | 473 |  | 432 |  |
| P4 | 516 | 500 |  | 480 |  |
| P5 | 562 | 545 |  | 524 |  |
| P6 | 388 | 365 |  | 339 |  |
| screw speed | 59 rpm | 60 rpm |  | 62 rpm | 62 rpm |
| Output (kg/hr) | 140 | 140 |  | 140 | 140 |
| Lay-flat (mm) | 900 | 900 |  | 900 | 900 |

TABLE 1-continued

|  | ECD109 95 w % PP-1 5 w % | ECD109 90 w % PP-1 10 w % | ECD109 80 w % PP-1 20 w % | ECD109 80 w % PP-1 15 w % LD-2 5 w % | ECD109 75 w % PP-1 20 w % LD-2 5 w % |
|---|---|---|---|---|---|
| Frost line (mm) | 700 | 700 |  | 700 | 700 |
| take off (m/min) | 28 | 28 |  | 28 | 28 |
| Blow up ratio | 2.9 | 2.9 |  | 2.9 | 2.9 | w % weight percent based upon the weight of the polymers.

TABLE 2

|  | ECD109 95 w % PP-1 5 w % | ECD109 90 w % PP-1 10 w % | ECD109 80 w % PP-1 20 w % | ECD109 80 w % PP-1 15 w % LD-2 5 w % | ECD109 75 w % PP-1 20 w % LD-2 5 w % |
|---|---|---|---|---|---|
| Haze (%) | 19 | 18 | 22 | 9.5 | 9.7 |
| Gloss (%) | 7.8 | 7.1 | 5.4 | 10.7 | 9.9 |
| Max Force N/$\mu$ | 1.3 | 1.3 | 1.3 | 1.2 | 1.2 |
| Damaging Energy mJ/$\mu$ | 20 | 17 | 12 | 13 | 11 |
| Total Energy mJ/$\mu$ | 22 | 20 | 14 | 16 | 12 |
| Damaging Travel (mm) | 24 | 20 | 16 | 18 | 15 |
| Total Travel (mm) | 25 | 28 | 18 | 23 | 17 |
| Tensile @ Yield (Mpa) MD | 14.1 | 16.2 | 18.7 | 16.1 | 18.5 |
| Elong @ Yield (%) MD | 16.1 | 13.1 | 12 | 16.8 | 14.1 |
| Tensile @ Break (MPa) MD | 61 | 64 | 62 | 61 | 60 |
| Elong @ Break (%) MD | 682 | 670 | 649 | 678 | 674 |
| Energy MD (mJ/mm3) | 168 | 177 | 176 | 180 | 190 |
| Tensile @ Yield (Mpa) TD | 14.6 | 15.7 | 17.8 | 16.4 | 18.1 |
| Elong @ Yield (%) TD | 12.5 | 11.2 | 10.0 | 10.0 | 9.9 |
| Tensile @ Break (MPa) TD | 56 | 57 | 50 | 54 | 51 |
| Elong @ Break (%) TD | 724 | 735 | 698 | 719 | 706 |
| Energy TD (mJ/mm3) | 169 | 177 | 160 | 167 | 164 |
| Secant Modulus (MPa) MD | 335 | 444 | 548 | 442 | 539 |
| Secant Modulus (MPa) TD | 369 | 440 | 540 | 478 | 557 |
| Average Secant Modulus (MPa) | 352 | 442 | 544 | 460 | 548 |
| Elmendorf tear (g/$\mu$) MD | 8.9 | 7.8 | 5.6 | 7.1 | 4.3 |
| Elmendorf Tear (g/$\mu$) TD | 15 | 13 | 10 | 16 | 15 |

TD = transverse direction.
MD = machine direction.

TABLE 3

|  | ECD103 100 w % | ECD103 95 w % LD-150 5 w % | ECD103 80 w % PP-1 15 w % LD-2 5 w % | ECD103 75 w % PP-1 20 w % LD-2 5 w % |
|---|---|---|---|---|
| Barrell temp settings (° C.) |  |  |  |  |
| zone 1 | 170 | 190 | 190 | 191 |
| zone 2 | 175 | 200 | 200 | 201 |
| zone 3 | 175 | 220 | 220 | 219 |
| zone 4 | 175 | 220 | 220 | 219 |
| zone 6 | 185 | 230 | 225 | 224 |
| zone 7 | 185 | 230 | 230 | 230 |
| zone 8 | 185 | 230 | 222 | 228 |
| zone 9 | 190 | 240 | 239 | 240 |
| zone 10 | 190 | 240 | 240 | 240 |
| zone 11 | 200 | 240 | 240 | 240 |
| zone 12 | 200 | 240 | 240 | 240 |
| diegap (mm) | 1.5 | 1.5 | 1.5 | 1.5 |
| cooling air temp (° C.) | 17 | 16 | 16 | 17 |
| Die Diam (mm) | 200 | 200 | 200 | 200 |
| Melt temp. (° C.) |  |  |  |  |
| T1 | 214 | 243 | 231 | 230 |
| T2 | 227 | 248 | 235 | 234 |
| T3 | 233 | 252 | 238 | 236 |
| T4 | 226 | 248 | 234 | 233 |
| T5 | 211 | 242 | 231 | 230 |
| Tmelt | 206 | 243 | 230 | 231 |

TABLE 3-continued

|  | ECD103 100 w % | ECD103 95 w % LD-150 5 w % | ECD103 80 w % PP-1 15 w % LD-2 5 w % | ECD103 75 w % PP-1 20 w % LD-2 5 w % |
|---|---|---|---|---|
| Melt pressure (bar) |  |  |  |  |
| P1 | 440 | 234 | 276 | 245 |
| P2 | 437 | 278 | 301 | 275 |
| P3 | 456 | 316 | 370 | 305 |
| P4 | 517 | 400 | 397 | 378 |
| P5 | 600 | 465 | 446 | 425 |
| P6 | 414 | 326 | 304 | 288 |
| screw speed | 52 rpm | 68 rpm | 67 rpm | 68 rpm |
| Output (kg/hr) | 133 | 138 | 139 | 141 |
| Lay-flat (mm) | 930 | 900 | 900 | 900 |
| Frost line (mm) | 600 | 700 | 700 | 700 |
| take off (m/min) | 26 | 28 | 28 | 28 |
| blow up ratio | 3.0 | 2.9 | 2.9 | 2.9 | w % = weight percent based upon the weight of the polymers.

TABLE 4

|  | ECD103 100% | ECD103 95 w % LD 150 5 w % | ECD103 80 w % PP-1 15 w % LD-2 5 w % | ECD103 75 w % PP-1 20 w % LD-2 5 w % |
|---|---|---|---|---|
| Haze (%) | 25 | 5.4 | 3.7 | 4.7 |
| Gloss (%) | 5.8 | 12.9 | 13.0 | 12.0 |
| Max Force N/$\mu$ | >1.7 | >1.7 | 1.4 | 1.4 |
| Damaging Energy mJ/$\mu$ | >47 | >47 | 24 | 22 |
| Total Energy mJ/$\mu$ | >47 | >47 | 26 | 25 |
| Damaging Travel (mm) | >44 | >44 | 26 | 24 |
| Total Travel (mm) | >44 | >44 | 28 | 27 |
| Tensile @ Yield (Mpa) MD | 10.0 | 10.2 | 15.2 | 15.9 |
| Elong @ Yield (%) MD | 13.9 | 13.6 | 16 | 15.4 |
| Tensile @ Break (MPa) MD | 69 | 62 | 65 | 64 |
| Elong Break (%) MD | 613 | 642 | 637 | 653 |
| Energy MD (mJ/mm3) | 143 | 148 | 173 | 178 |
| Tensile @ Yield (Mpa) TD | 9.7 | 10.5 | 13.6 | 14.3 |
| Elong @ Yield (%) TD | 20.0 | 16.6 | 2.0 | 12.0 |
| Tensile @ Break (MPa) TD | 60 | 59 | 56 | 56 |
| Elong @ Break (%) TD | 661 | 671 | 692 | 688 |
| Energy TD (mJ/mm3) | 140 | 144 | 157 | 158 |
| Secant Modulus (MPa) MD | 183 | 202 | 395 | 443 |
| Secant Modulus (MPa) TD | 189 | 221 | 361 | 394 |
| Average Secant Modulus (MPa) | 186 | 212 | 378 | 419 |
| Elmendorf tear (g/$\mu$) MD | 12 | 12 | 13 | 12 |
| Elmendorf Tear (g/$\mu$) TD | 14 | 17 | 16 | 16 |

TABLE 5

Heat Seal Strength (N/15 mm) of 50 micron films

| Heat Seal Temp | ECD 103 95 w % LD-2 5 w % | ECD 103 75 w % ECD 103 75 w % LD-2 5 w % | ECD 109 75 w % ECD 109 75 w % LD-2 5 w % |
|---|---|---|---|
| 110° C. | 6.0 | 0.7 |  |
| 120° C. | 9.5 | 11.5 | 1.2 |
| 130° C. | 10.0 | 12.3 | 13.1 |
| 140° C. | 9.2 | 11.3 | 13.4 |
| 150° C. | 11.1 | 11.0 | 13.1 |
| 160° C. | 12.0 | 10.7 | 12.5 |
| 180° C. | 11.7 | 11.0 | 12.6 |

TABLE 6

|  | LL-3 80 w % LD-150 20 w % | ECD202 80 w % PP-1 15 w % LD-2 5 w % |
|---|---|---|
| Barrell temp settings (° C.) |  |  |
| zone 1 | 170 | 170 |
| zone 2 | 175 | 175 |
| zone 3 | 175 | 180 |
| zone 4 | 175 | 190 |
| zone 6 | 185 | 190 |
| zone 7 | 185 | 190 |
| zone 8 | 190 | 195 |
| zone 9 | 190 | 215 |
| zone 10 | 190 | 215 |

TABLE 6-continued

|  | LL-3 80 w %<br>LD-150 20 w % | ECD202 80 w %<br>PP-1 15 w %<br>LD-2 5 w % |
|---|---|---|
| zone 11 | 200 | 225 |
| zone 12 | 200 | 225 |
| diegap (mm) | 1.5 | 1.5 |
| cooling air temp (° C.) | 15 | 15 |
| Die Diam (mm) | 200 | 200 |
| Melt temp. (° C.) | | |
| T1 | 197 | 197 |
| T2 | 205 | 205 |
| T3 | 209 | 219 |
| T4 | 204 | 204 |
| T5 | 196 | 196 |
| Tmelt | 196 | 196 |
| Melt pressure (bar) | | |
| P1 | 563 | 201 |
| P2 | 620 | 207 |
| P3 | 595 | 210 |
| P4 | 556 | 207 |
| P5 | 552 | 200 |
| P6 | 412 | 200 |
| screw speed | 41 rpm | 44 rpm |
| Output (kg/hr) | 100 | 95 |
| Lay-flat (mm) | 785 | 785 |
| Frost line (mm) | 500 | 500 |
| take off (m/min) | 50 | 62 |
| blow up ratio | 2.5 | 2.5 | w % = weight percent based upon the weight of the polymers.

TABLE 7

|  | LL-3 80 w %<br>LD-150 20 w % | ECD202 80 w %<br>PP-1 15 w %<br>LD-2 5 w % |
|---|---|---|
| Haze (%) | 2.7 | 3.8 |
| Gloss (%) | 13.6 | 12.2 |
| Tensile @ Break (MPa) MD | 68.1 | 98.1 |
| Elong @ Break (%) MD | 474 | 552 |
| Tensile @ Break (MPa) TD | 35.4 | 49.4 |
| Elong @ Break (%) TD | 815 | 695 |
| Secant Modulus (MPa) MD | 407 | 337 |
| Secant Modulus (MPa) TD | 502 | 316 |
| Dart Drop (g/$\mu$m) | 3.1 | 8.1 |
| Elmendorf tear (g/$\mu$) MD | 0.3 | 4.0 |
| Elmendorf Tear (g/$\mu$) TD | 13.7 | 15.7 |

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A film comprising a blend comprising:
   i) a homopolymer of ethylene having an Mw/Mn of 3 or less or a copolymer of ethylene and up to 50 weight % of a $C_3$ to $C_{20}$ olefin, the copolymer having a CDBI of 50% or more;
   ii) a homopolymer of propylene or copolymer of propylene and up to 50 weight % of a comonomer selected from the group consisting of ethylene and $C_4$ to $C_{20}$ alpha-olefins; and
   iii) a polymer produced in a high pressure process using a free radical initiator.

2. The film of claim 1, wherein the copolymer of ethylene is a copolymer of ethylene and propylene, butene, hexene or octene.

3. The film of claim 2 wherein the copolymer of ethylene has a CDBI of 65 to 85%, a density of 0.915 g/cm$^3$ to 0.96 g/cm$^3$ and an Mw/Mn of from 1 to 2.5.

4. The film of claim 2 wherein the copolymer of ethylene has a CDBI of 80 to 99% and a density of 0.88 g/cm$^3$ to 0.925 g/cm$^3$.

5. The film of claim 1, wherein the film has a haze of 5% or less.

6. The film of claim 1, wherein the polymer produced in a high pressure process using a free radical initiator is low density polyethylene or ethylene vinyl acetate.

7. The film of claim 1, wherein the polyethylene component comprises a blend of the homopolymer of ethylene or the copolymer of ethylene and another polyolefin, and the polypropylene component comprises a blend of the homopolymer or copolymer of propylene and another polyolefin.

8. The film of claim 1 characterised in that when formed into a 50 $\mu$m thick film has an average secant modulus greater than 350 MPa and a dart drop impact strength greater than 5 g/$\mu$m.

9. The film of claim 1, wherein the film is sealed to a second layer.

10. A multi layer film wherein a non-surface layer comprises the film of claim 1.

11. A multi layer film wherein at least one surface layer comprises the film of claim 1.

12. The film of claim 1, wherein the film has been oriented.

13. The film of claim 1, wherein the film is co-extruded.

14. The film of claim 1, wherein the film is cast, blown or co-extruded and the polyethylene is present at 50 to 80 weight %, the polypropylene is present at 10 to 45 weight % and polymer produced in high pressure process using a free radical initiator is LDPE and is present at 2 to 10 weight %, based upon the weight of the blend.

15. The film of claim 1, wherein the film is laminated to a substrate.

16. The film of claim 15, wherein the substrate is polypropylene, polyarnide, polyester, polyethylene, or a metallized substrate.

17. A method to produce a film having good haze values comprising:
   i) selecting a first polymer having a CDBI of 50% or more comprising homopolyethylene or a copolymer of ethylene and up to 50 weight % of a $C_3$ to $C_{20}$ olefin,;
   ii) selecting a second polymer comprising homopolypropylene or a copolymer of propylene and up to 50 weight % of ethylene or a $C_4$ to $C_{20}$ olefin;
   iii) selecting a third polymer comprising one or more polymers produced in a high pressure process using a free radical initiator; and
   iv) combining the first, second and third polymers and forming them into a film.

18. A method to produce a film, the method comprising:
   i) selecting a first polymer having a CDBI of 50% or more comprising homopolyethylene or a copolymer of ethylene and up to 50 weight % of a $C_3$ to $C_{20}$ olefin;
   ii) selecting a second polymer comprising homopolypropylene or a copolymer of propylene and up to 50 weight % of ethylene or a $C_4$ to $C_{20}$ olefin;
   iii) selecting a third polymer comprising a high pressure polymer producing a process using a free radical initiator;

iv) combining the first polymer, second polymer and third polymer to form all or part of a film surface layer.

19. A method of packaging an article using the film of claim 1, the method comprising enclosing the article in the film and heat sealing the film such that at least one seal is formed by heat sealing a first surface layer to a second surface layer.

20. A film having a thickness of from 10 to 120 μm, and a haze of 16% or less, as determined by ASTM 1003, condition A, comprising a blend having:
 a) from 10–90 weight % of a copolymer of ethylene and up to 50 weight % of a $C_3$–$C_{20}$ olefin, said copolymer having a density of from 0.915 $g/cm^3$ to 0.935 $g/cm^3$;
 b) from 10–90 weight % of a homopolymer of propylene or a copolymer of propylene and up to 50 weight % of a comonomer; and
 c) from 1–30 weight % of a polymer produced in a high pressure process using a free radical initiator.

21. The film of claim 20, wherein:
 a) said copolymer of ethylene is present in said blend from 20 to 80 weight %, said copolymer of ethylene has a $M_w/M_n$ of 3 or less and a CDBI of 50% or more, wherein said $C_3$–$C_{20}$ olefin is propylene, butene, hexene, or octene;
 b) said copolymer or homopolymer of propylene is present in said blend from 20–80 weight %, wherein said copolymer of propylene is a copolymer of a $C_4$–$C_{20}$ olefin, where said olefin is present in said copolymer from 1–35 weight %; and
 c) said high pressure produced polymer is present in said blend from 2–30 weight %, and has a density from 0.910 $g/cm^3$ to 0.940 $g/cm^3$.

22. The film of claim 20 wherein said blend has
 a) from 30–70 weight % of said copolymer of ethylene, wherein said copolymer of ethylene has a Mw/Mn from 1 to 2.5, a CDBI from 60%–85%, wherein said copolymer has $C_3$–$C_{20}$ olefin content of 1–35 weight %, wherein said olefin is propylene, butene, hexene, or octene;
 b) from 30–70 weight % of said homopolymer or copolymer of propylene, wherein said comonomer is present in said copolymer from 1–6 weight %, and wherein said comonomer is ethylene or a $C_4$–$C_{20}$ olefin; and
 c) from 5–20 weight % of said polymer produced in a high pressure process, wherein said polymer has a density of from 0.915 $g/cm^3$ to 0.935 $g/cm^3$.

23. The film of claim 20, wherein the copolymer of propylene has a CDBI of 70% or more and an MFR as determined by ASTM 1238, of 1–20 dg/min, and wherein said blend has a haze 14% or less.

24. The film of claim 20, wherein the film has an average Secant modulus greater than 350 MPa and a dart drop impact strength greater than 5 g/μm.

25. A multi layer film comprising an ABC structure, wherein the A layer is a metallocene catalyst produced polyethylene or a blend with a metallocene catalyzed polyethylene; the B layer is the film of claim 20, and the C layer is a sealing layer including a random copolymer of propylene and 3–6 weight % ethylene.

* * * * *